United States Patent
Gray et al.

(10) Patent No.: US 6,935,687 B1
(45) Date of Patent: Aug. 30, 2005

(54) MOUNTING ANCHOR FOR A MOTOR VEHICLE

(75) Inventors: Charles A. Gray, Noblesville, IN (US); Mark A. Lynn, Warren, OH (US); Mark A. Ginter, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/784,649

(22) Filed: Feb. 23, 2004

(51) Int. Cl.$^7$ ................................................ A47C 1/08
(52) U.S. Cl. ...................... 297/253; 297/217.3; 24/644
(58) Field of Search ....... 297/253, 217.3; 24/604–628, 24/629–645, 658

(56) References Cited

U.S. PATENT DOCUMENTS

| | | | | |
|---|---|---|---|---|
| 4,345,791 A | * | 8/1982 | Bryans et al. | 297/256.14 |
| 4,785,906 A | * | 11/1988 | Kang | 180/270 |
| 5,742,986 A | * | 4/1998 | Corrion et al. | 24/633 |
| 5,892,436 A | * | 4/1999 | Blackburn et al. | 340/457.1 |
| 5,898,366 A | * | 4/1999 | Brown et al. | 340/457.1 |
| 5,907,892 A | * | 6/1999 | Todd | 24/642 |
| 5,966,784 A | * | 10/1999 | Arbogast et al. | 24/633 |
| 6,116,696 A | * | 9/2000 | Widman et al. | 297/483 |
| 6,138,332 A | * | 10/2000 | Mori | 24/633 |
| 6,205,629 B1 | * | 3/2001 | Becker | 24/633 |
| 6,325,412 B1 | * | 12/2001 | Pan | 280/733 |
| 6,390,560 B1 | * | 5/2002 | Gandhi et al. | 297/463.1 |
| 6,416,129 B1 | | 7/2002 | Hirota | |
| 6,604,793 B2 | | 8/2003 | Habedank | |
| 6,631,958 B1 | * | 10/2003 | Herrmann et al. | 297/463.1 |
| 6,820,310 B2 | * | 11/2004 | Woodard et al. | 24/171 |
| 6,827,400 B2 | * | 12/2004 | Menon et al. | 297/250.1 |

* cited by examiner

*Primary Examiner*—Peter M. Cuomo
*Assistant Examiner*—Erika Garrett
(74) *Attorney, Agent, or Firm*—Stefan V. Chmielewski

(57) ABSTRACT

A mounting anchor for a motor vehicle includes a locking bar, a first switch, a first movable plate, a second switch and a second movable plate. The first switch is positioned adjacent a first side of the locking bar and the first movable plate is positioned to slidably engage a groove on the first side of the locking bar. The first movable plate includes a first activation area for receiving a portion of the first switch and a first aperture for receiving a first rotatable arm. The second switch is positioned adjacent a second side of the locking bar, which is opposite the first side of the locking bar. The second movable plate is positioned to slidably engage a groove on the second side of the locking bar and includes a second activation area for receiving a portion of the second switch and a second aperture for receiving a second rotatable arm.

21 Claims, 7 Drawing Sheets

MOUNTING ANCHOR FOR A MOTOR VEHICLE

TECHNICAL FIELD

The present invention is generally directed to a mounting anchor and, more specifically, a mounting anchor for a motor vehicle.

BACKGROUND OF THE INVENTION

Traditionally, motor vehicle manufacturers have designed cars to meet many different safety standards and regulations, which have been implemented to protect adult occupants. As such, car seat cushions, seat belt design and anchorage locations have all been optimized for the comfort and protection of adults. Unfortunately, motor vehicle design has not traditionally taken into account that child restraints may need to be attached to one or more of the components of a motor vehicle. In 1990, a standard system known as ISOFIX was proposed for attaching child restraints in motor vehicles in a manner that reduced the risk of injury to a child in the event of a collision.

Broadly, the goals of ISOFIX are to provide a standard universal means of attaching child restraints, eliminate improper installation of child restraints in motor vehicles, improve dynamic performance of child restraints and ensure a more consistent dynamic performance of child restraints. However, while ISOFIX mounting anchors are becoming more common in the front passenger seat of motor vehicles sold in North America, existing ISOFIX mounting anchors do not allow for the detection of a child seat.

What is needed is a mounting anchor that allows for the detection of a child seat. It would also be desirable if the mounting anchor provided for differentiating between rearward facing infant seats, forward facing infant seats and a booster seat or car bed.

SUMMARY OF THE INVENTION

A mounting anchor for a motor vehicle includes a locking bar, a first switch, a first movable plate, a second switch and a second movable plate. A portion of the locking bar is shaped to receive a mateable connector and an interior of at least portions of first and second sides of the locking bar include grooves. The first switch is positioned adjacent the first side of the locking bar and the first movable plate is positioned to slidably engage the groove on the first side of the locking bar. The first movable plate includes a first activation area for receiving a portion of the first switch and a first aperture for receiving a first rotatable arm. The second switch is positioned adjacent the second side of the locking bar, which is opposite the first side of the locking bar. The second movable plate is positioned to slidably engage the groove on the second side of the locking bar and includes a second activation area for receiving a portion of the second switch and a second aperture for receiving a second rotatable arm. The mateable connector includes at least one of the first and second rotatable arms, which, when received in an associated one of the first and second apertures, initiates movement of an associated one of the first and second movable plates and activation of at least one of the first and second switches.

According to another embodiment of the present invention, the locking bar is shaped to engage a releasable lock for receiving and retaining the locking bar with the releasable lock being included within the mateable connector. According to a further embodiment of the present invention, the lock includes a pair of locking jaws, each shaped to engage the locking bar. The mateable connector may be attached to one of a front of an infant seat, a rear of an infant seat, a booster seat and a car seat. According to a further embodiment of the present invention, the mounting anchor includes a spring for biasing the first and second movable plates toward a front of the locking bar. According to an additional aspect of the present invention, the spring includes separate springs for individually biasing the first and second movable plates.

According to a different aspect of the present invention, the first and second movable plates are slidably engaged and, according to yet another embodiment of the present invention, the first and second movable plates are coplanar.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to the present invention, a mounting anchor is disclosed herein that includes two movable switches that provide three distinct electromechanical states such that rearward facing child seats, forward facing child seats and a booster seat or car bed can be distinguished from one another such that motor vehicle subsystems can take appropriate action based thereon. For example, a motor vehicle subsystem may deactivate a passenger-side airbag and/or provide a warning that a rearward facing child seat should not be placed in the front of the motor vehicle when the child seat is attached to a mounting anchor associated with a front passenger-side seat. As is disclosed herein, a number of different alternative electrical circuits may be used to interface with two movable switches such that an electronic control unit can readily determine the presence/absence of a child seat and specifically identify any child seat that is present and/or detect an improperly installed seat and issue a warning.

Figure 1:
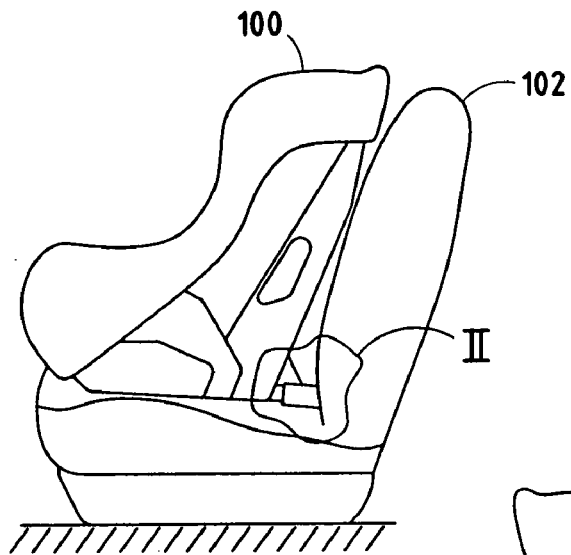
FIG. 1 depicts a side view of a child seat in a forward position coupled to an automotive seat by a mounting anchor constructed according to one embodiment of the present invention.
Figure 2:
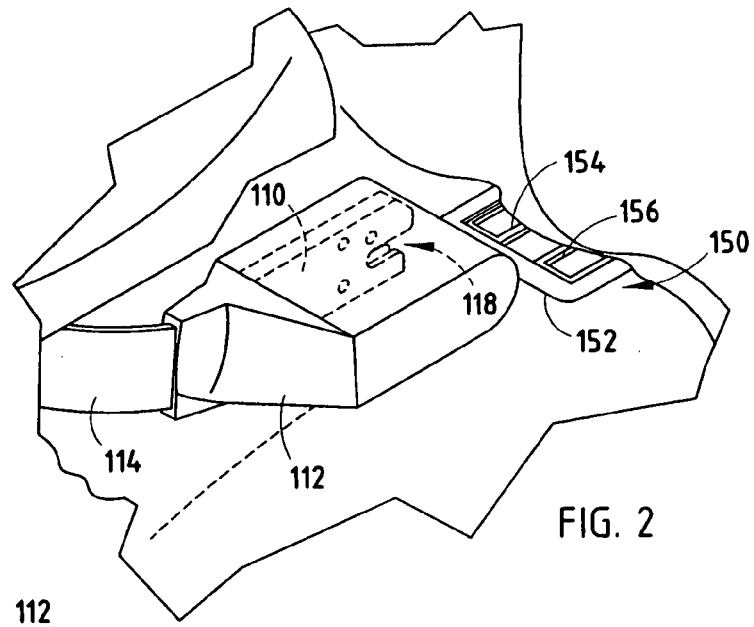
FIG. 2 is an exploded perspective view of an area 11 of FIG. 1.
Figure 2A:
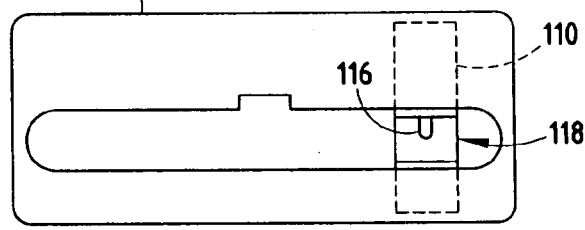
FIG. 2A is a front view of a shrouded mateable connector, with reference to FIG. 2.

FIG. 1 depicts a child seat 100 mounted to an automotive seat 102 in a forward facing position. With reference to FIG. 2, a mateable connector 110 is coupled to a belt 114 that is attached to the child seat 100. The connector 110 includes a shroud 112 that receives a mounting anchor 150 that includes a locking bar 152, which is shaped to receive the mateable connector 110, and includes a first movable plate 154 and a second movable plate 156 slidably engaged within an interior of the locking bar 152. The mateable connector 110 is positioned within the shroud 112 and actuates the first movable plate 154 when the movable connector 110 is mated to the locking bar 152. As is better shown in FIG. 2A, the mateable connector 110 includes a first rotatable arm 116 that extends downward in a slot 118 of the connector 110.

Figure 1A:
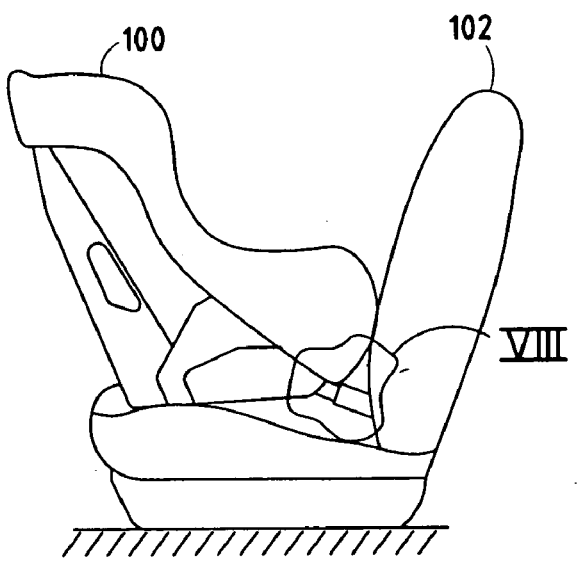
FIG. 1A depicts the child seat coupled to an automotive seat in a rearward facing manner by a mounting anchor constructed according to the present invention.
Figure 8:
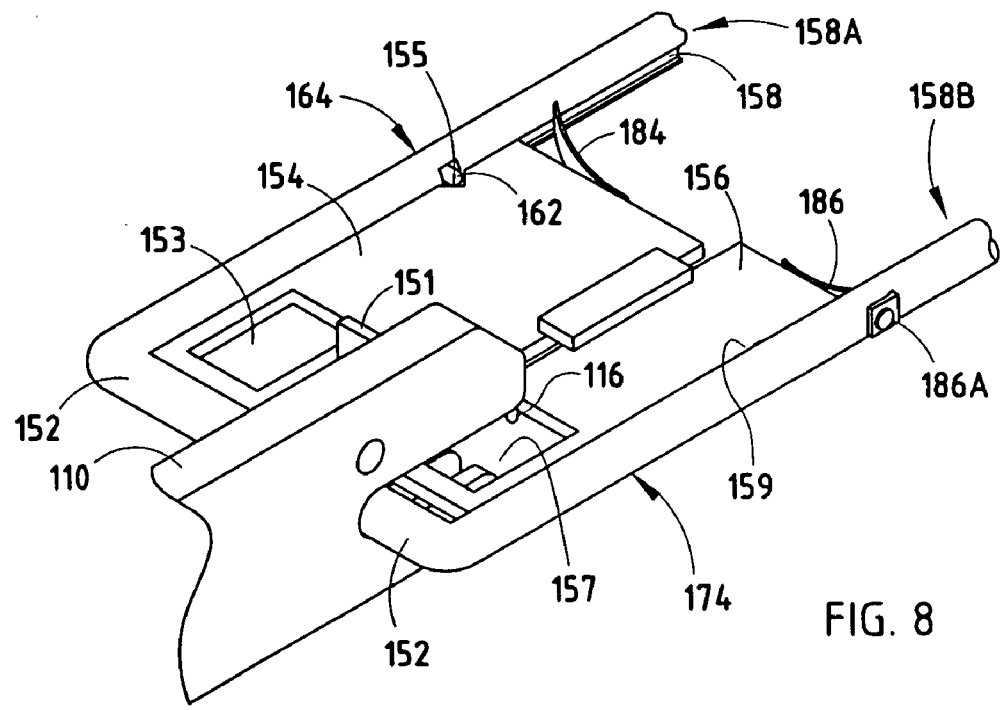
FIG. 8 is a perspective view of a mateable connector engaging a second movable plate of a mounting anchor.

FIG. 1A depicts a child seat 100 attached to the seat 102 in a rearward facing fashion. With reference to FIG. 8, the mateable connector 110 is locked to the locking bar 152 and the second movable plate 156 has been slid such that switch 172 (see FIG. 3) is actuated. As is also shown in FIG. 8, a spring 184 biases the first movable plate 154 toward a front of the locking bar 152 and a spring 186 biases the plate 156 toward a front of the locking bar 152. As is shown in FIG. 8, the spring 186 may be attached to a side 174 of the locking bar 152 by a rivet 186A.

Figure 1B:
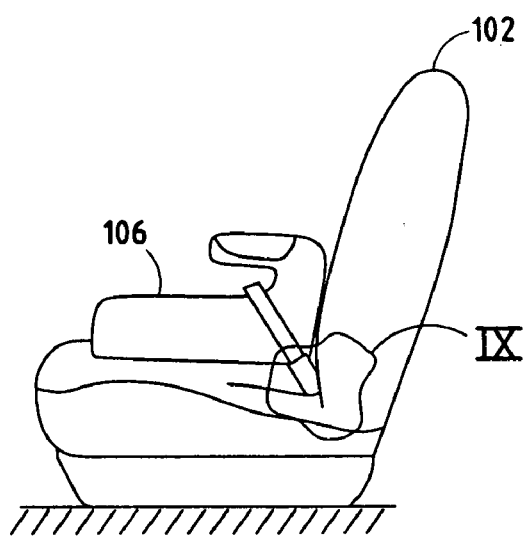
FIG. 1B depicts a booster seat coupled to an automotive seat by a mounting anchor constructed according to the present invention.
Figure 9:
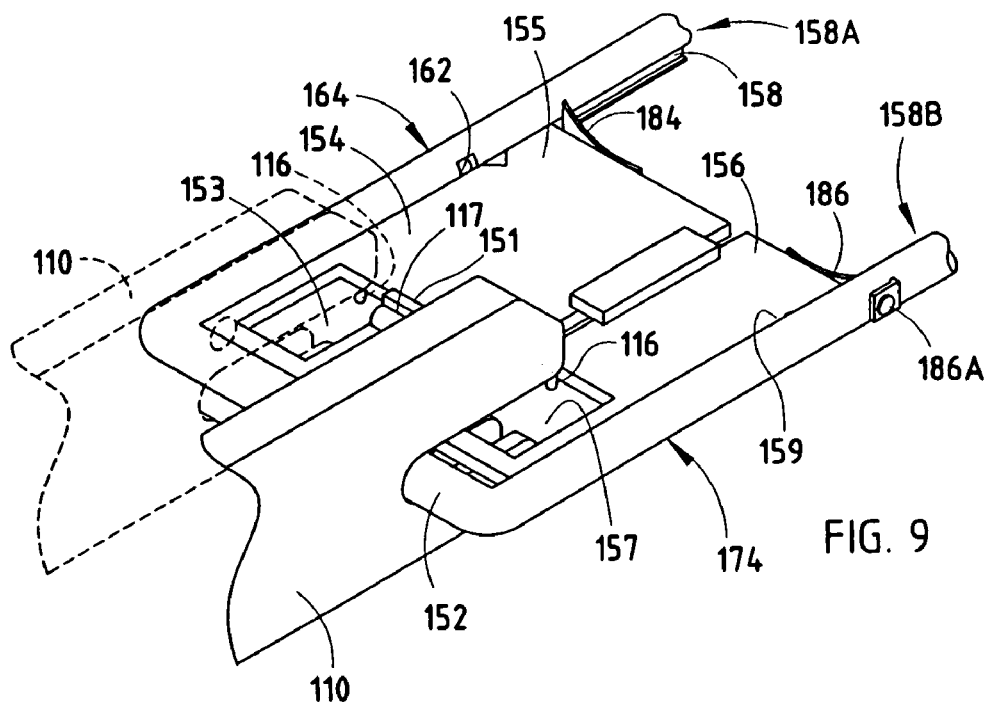
FIG. 9 is a perspective view of a mateable connector engaging both first and second movable plates of a mounting anchor.

FIG. 1B depicts a car bed 106 attached to the automotive seat 102. With reference to FIG. 9, in this situation, the car bed 106 may include two mateable connectors 110, which engage the mounting anchor 150. In this embodiment, the engagement of the mateable connectors 110 causes the plates 154 and 156 to move, actuating the switches 162 and 172, respectively, thus, providing an indication of the type of child restraint that is coupled to the mounting anchor 150. Alternatively, the left connector 110 can be deleted, providing the right connector 110 is modified to include an engaging pin 117 extending from an inside of the right connector 110. In this embodiment, the engaging pin engages the tab 151 of the plate 154 to effect actuation of the switches 162 and 172.

Figure 3:
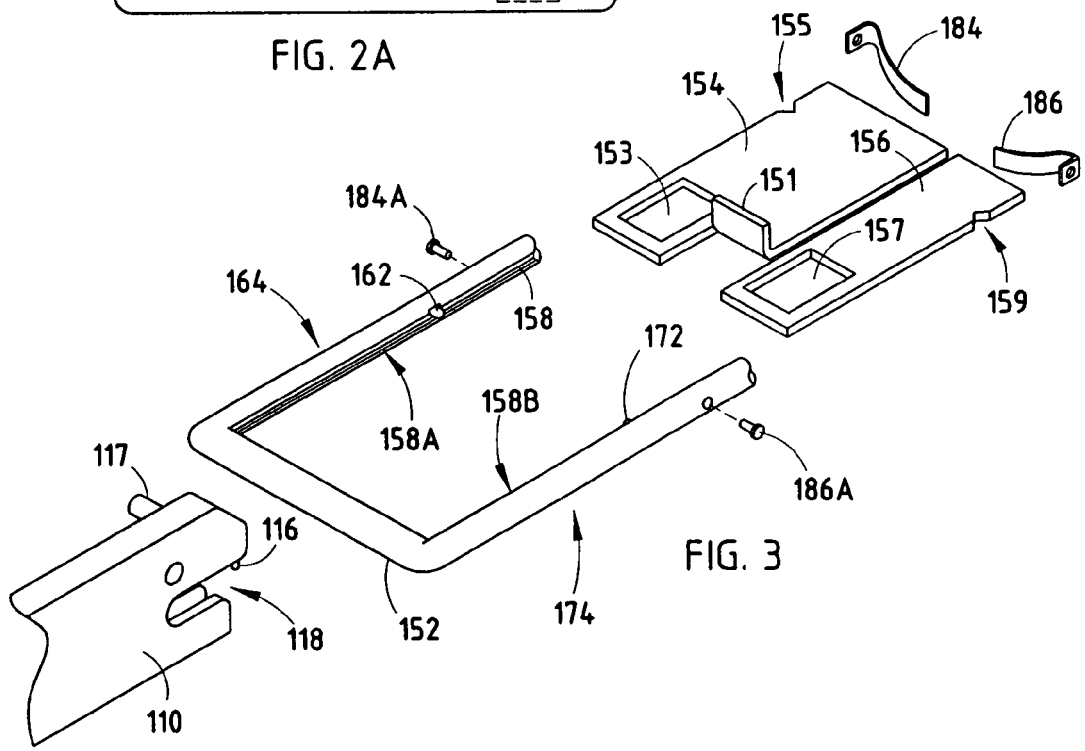
FIG. 3 is a partially exploded view of a mateable connector and a mounting anchor.

As is better shown in FIG. 3, the locking bar 152 includes a groove 158A formed in an interior of a first side 164 and a groove 158B formed in an interior of a second side 174. The first switch 162 is located adjacent the first side 164 of the locking bar 152 and the second switch 172 is located adjacent the second side 174 of the locking bar 152. The first movable plate 154 includes an aperture 153 and a first activation area 155 that is utilized to activate the first switch 162 when the mateable connector 110 is engaged with the locking bar 152 and, correspondingly, the first rotatable arm 116 has engaged the aperture 153 in the plate 154. Similarly, the second movable plate 156 includes an aperture 157 and a second activation area 159, which activates the switch 172 when a rotatable arm 116 of a mateable connector 110 is engaged in the aperture 157 of the plate 156. As discussed above, when implemented on a car bed, the connector 110 may include the engaging pin 117 to effect actuation of both of the switches 162 and 172 with a single mateable connector.

Figure 4:
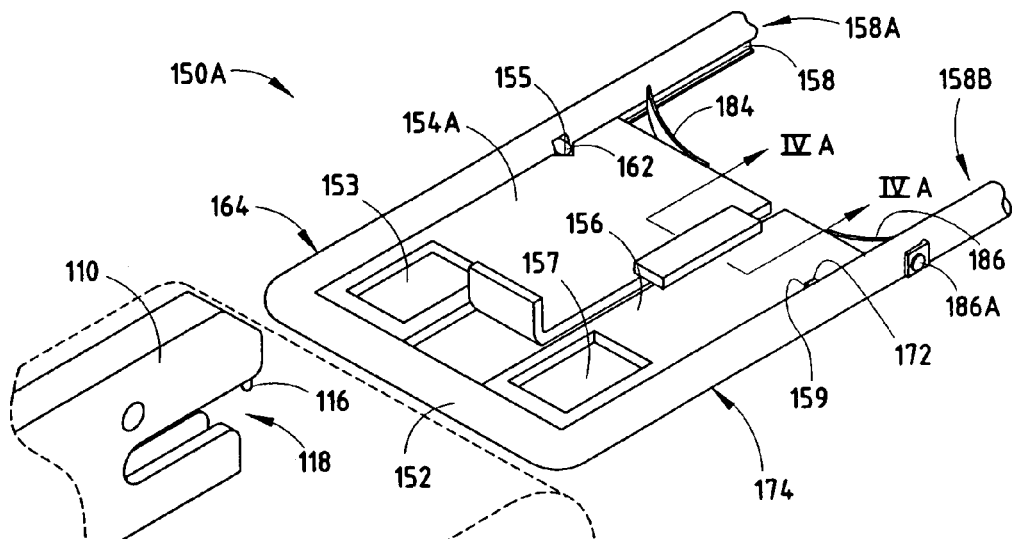
FIG. 4 is a perspective view of a shrouded mateable connector and a portion of a mounting anchor constructed according to one aspect of the present invention.
Figure 4A:
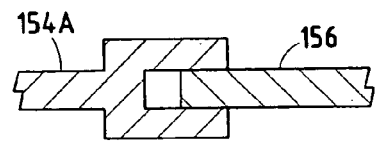
FIG. 4A is a partial cross-sectional view depicting the area of slidable engagement between the first and second movable plates of FIG. 4.

As is shown in FIG. 4, the mateable connector 110 mates with a mounting anchor 150A, configured according to an alternative embodiment of the present invention. As is best shown in FIG. 4A, a first mateable plate 154A is configured to slidably engage the second movable plate 156.

Figure 5:
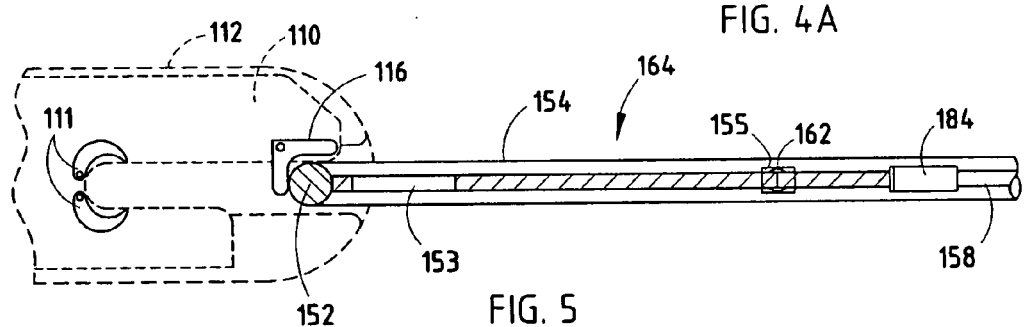
FIG. 5 is a cross-sectional view of the mounting anchor of FIG. 10 initially engaging the shrouded mateable connector.
Figure 6:
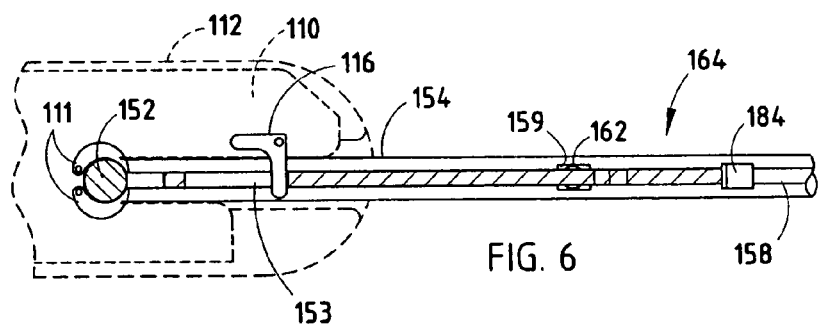
FIG. 6 is a cross-sectional view of the mateable connector of FIG. 10 locked to the mounting anchor.
Figure 7:
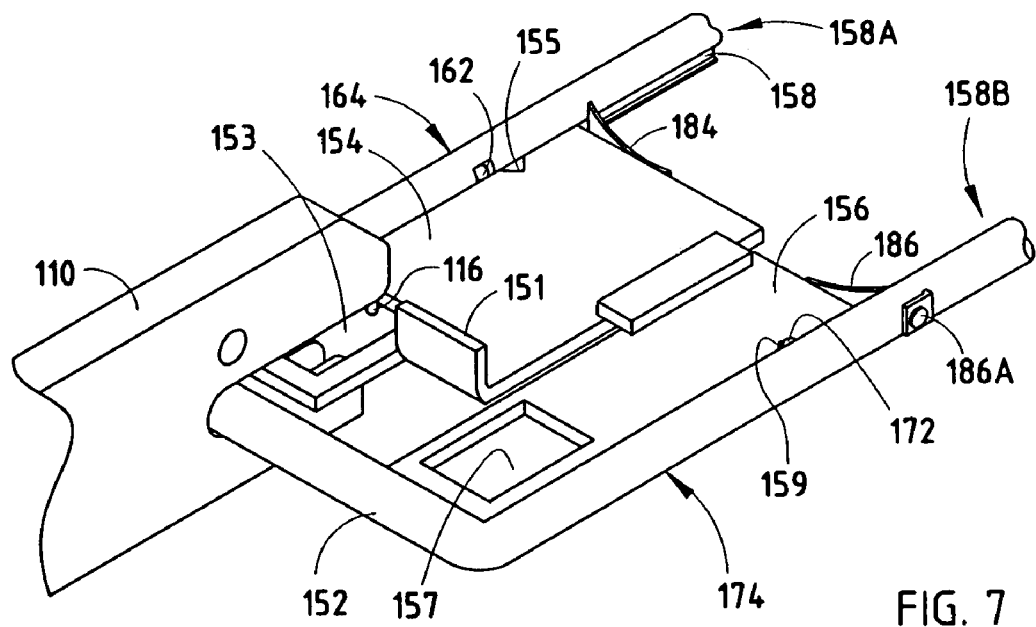
FIG. 7 is a perspective view of a mateable connector engaging a first movable plate of a mounting anchor.
Figure 10:
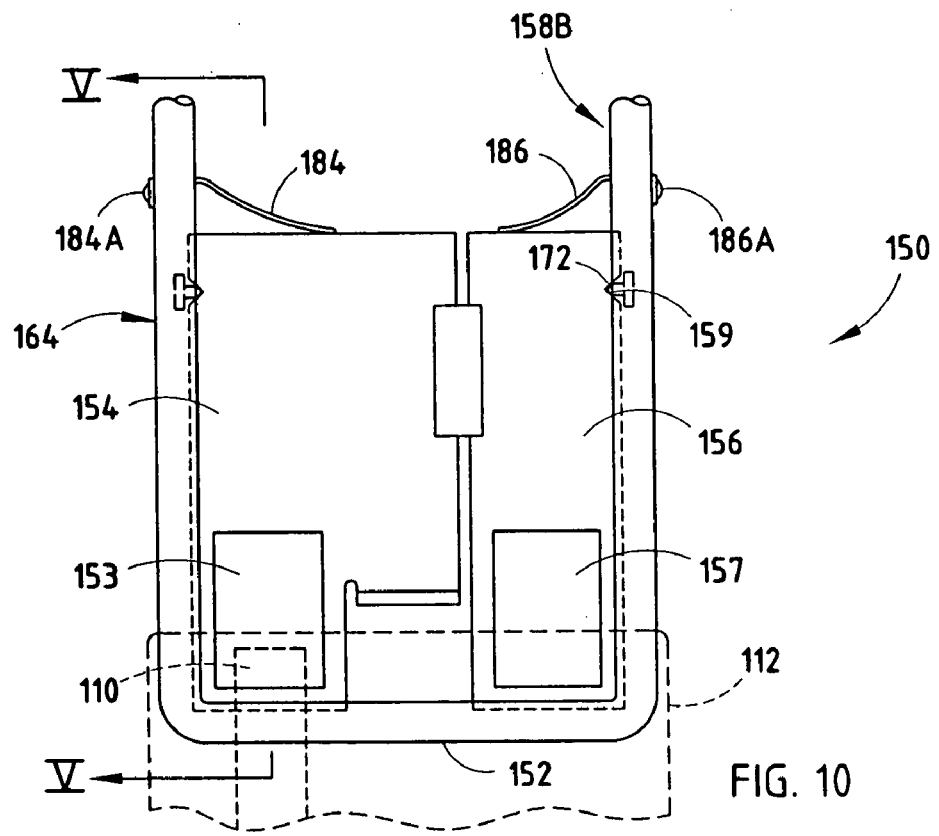
FIG. 10 is a top view of a mounting anchor according to one embodiment of the present invention.

FIG. 5 shows the mateable connector 110 initially engaging the mounting anchor 150A. FIG. 6 shows the mateable connector 110 fully engaged with the locking bar 152. As is shown, locking jaws 111 of the mateable connector 110 are shaped to engage an end of the locking bar 152. As is also shown, the rotatable arm 116 has rotated into the aperture 153 and has caused the plate 154 to slide in the groove 158A formed in a first side of the locking bar 152 actuating the first switch 162. As is depicted, the spring 158 is in tension such that when the mateable connector 110 is released from the locking bar 152, the spring 158 forces the plate 154 back toward the front of the locking bar 152. FIG. 10 depicts a top view of the anchor 150.

Accordingly, mounting anchors have been described herein that are capable of being utilized in a mounting anchor system to provide an indication of the type of device that is coupled to the mounting anchor, i.e., a forward facing child seat, a rearward facing child seat or a car bed.

Figure 11:
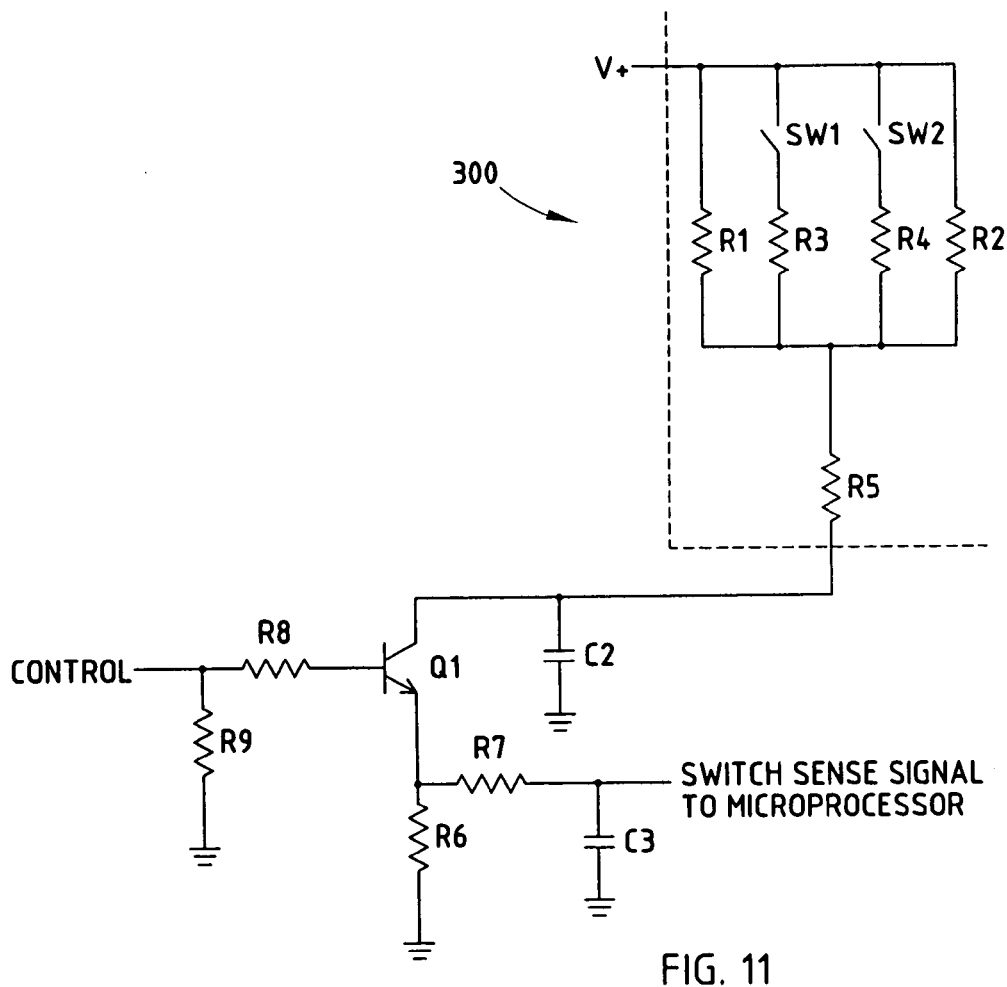
FIGS. 11–13 are electrical schematics of electrical interface circuits that may be utilized to electrically couple first and second switches associated with the mounting anchor to an electronic control unit for determination of whether the first and second switches are activated.
Figure 12:
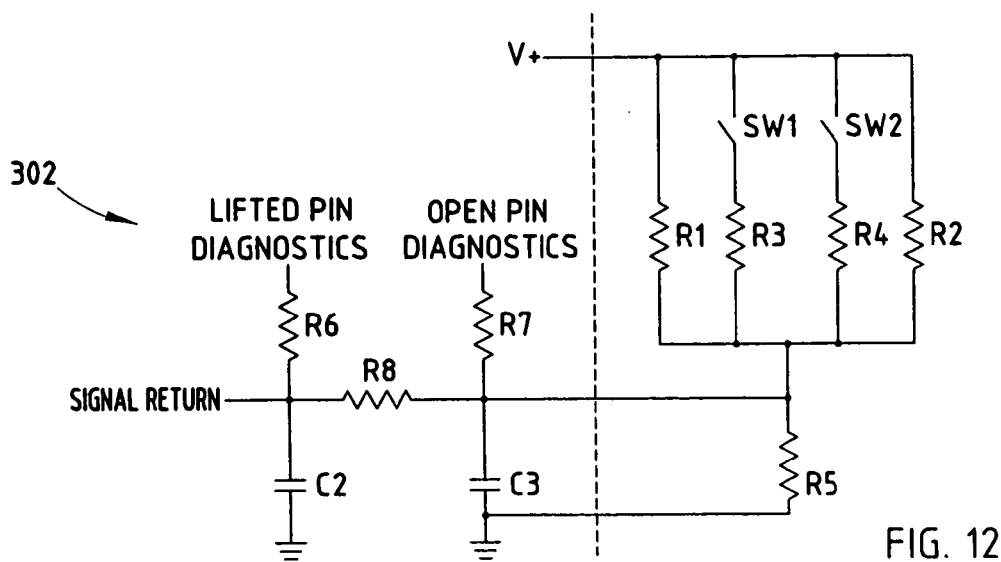
Figure 13:
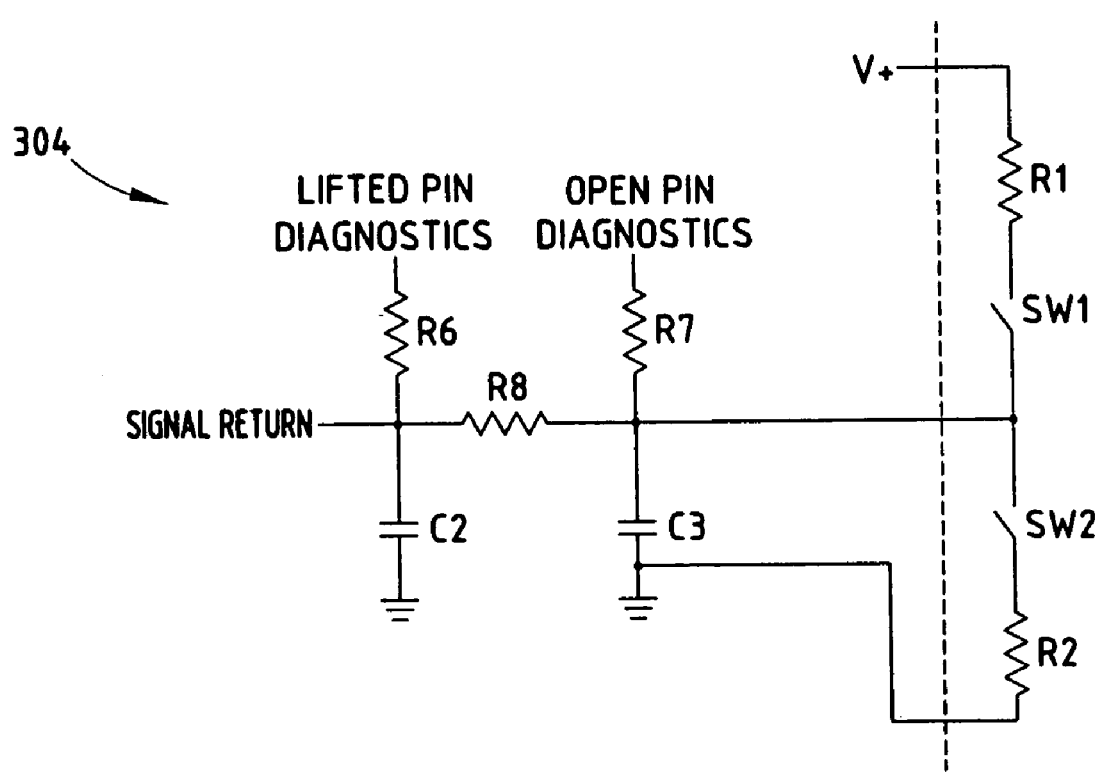

As is shown in FIGS. 11–13, a wide variety of electrical interface circuits may be utilized to distinguish whether first and second switches of a mounting anchor are activated. With reference to FIG. 11, a Hall-effect type interface 300 is shown. The interface 300 of FIG. 11 is a two wire interface defined by the following equations:

$$I_0 = V + /((R1*R2)/(R1+R2) + R5)$$

$$I_1 = V + /(((R1*R2)/(R1+R2)*R3)/(R1*R2)/(R1+R2) + R3)) + R5)$$

$$I_2 = V + /(((R1*R2)/(R1+R2)*R4)/(R1*R2)/(R1+R2) + R4)) + R5)$$

$$I_3 = V + /(((R1*R3)/(R1+R3)*(R2*R4)/(R2+R4)/((R1*R3)/(R1+R3) + (R2*R4)/(R2+R4)) + R5)$$

where $I_0$ is the state where neither switch S1 nor switch S2 are closed, $I_1$ is the state where switch S1 is closed, $I_2$ is the state where switch S2 is closed and $I_3$ is the state where both switches S1 and S2 are closed. Depending on individual application requirements, care should be taken in selecting component values to assure sufficient differentiation between current levels.

With reference to FIG. 12, another exemplary interface 302 is shown. The equations for the interface 302 are set forth below:

$$V_0 = V+ *R5/((R1*R2)/(R1+R2)+R5)$$

$$V_1 = V+ *R5/(((R1*R2)/(R1+R2)*R3)/(R1*R2)/(R1+R2)+R3))+R5)$$

$$V_2 = V+ *R5/(((R1*R2)/(R1+R2)*R4)/(R1*R2)/(R1+R2)+R4))+R5)$$

$$V_3 = V+ *R5/(((R1*R3)/(R1+R3)*(R2*R4)/(R2+R4)/(R1*R3)/(R1+R3)+(R2*R4)/(R2+R4)+R5)$$

where $V_0$ is the state where neither switch SW1 nor switch SW2 are closed, $V_1$ is the state where switch SW1 is closed, $V_2$ is the state where switch SW2 is closed and $V_3$ is the state where both switches SW1 and SW2 are closed. The interface 302 provides voltage differentiation between the possible levels. However, the interface 302 is a three wire interface and may be more susceptible to coupled noise, partial opens and partial shorts.

With reference to FIG. 13, another analog voltage interface 304 is shown that provides greater differentiation between levels than the interface 302 of FIG. 12. In its current state, the interface 304 cannot differentiate an open pin from state 0, cannot differentiate a short to ground on a return from state 2 and cannot differentiate a short to battery on a return from state 1. The equations which define the interface 304 are shown below:

$$V_0 = \text{Float}$$

$$V_1 = V^+$$

$$V_2 = \text{Ground}$$

$$V_3 = V^+ *R2/(R1+R2)$$

Accordingly, a number of electrical interface circuits have been described herein that may be utilized in a mounting anchor system designed according to the present invention. It should be appreciated that the electrical interface circuit utilized in a mounting anchor system designed according to the present invention is not critical and a wide variety of electrical interface circuits may be utilized. The electrical interface circuits shown in FIGS. 11–13 have been provided for reference only.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A mounting anchor for a motor vehicle, comprising:
a locking bar, wherein a portion of the locking bar is shaped to receive a mateable connector, and wherein an interior of at least portions of first and second sides of the locking bar include grooves;
a first switch positioned adjacent the first side of the locking bar;
a first movable plate positioned to slidably engage the groove on the first side of the locking bar, the first movable plate including a first activation area for receiving a portion of the first switch and a first aperture for receiving a first rotatable arm;
a second switch positioned adjacent the second side of the locking bar, wherein the second side of the locking bar is opposite the first side of the locking bar; and
a second movable plate positioned to slidably engage the groove on the second side of the locking bar, the second movable plate including a second activation area for receiving a portion of the second switch and a second aperture for receiving a second rotatable arm, wherein the mateable connector includes at least one of the first and second rotatable arms which when received in an associated one of the first and second apertures initiates movement of an associated one of the first and second movable plates and activation of at least one of the first and second switches.

2. The anchor of claim 1, wherein the locking bar is shaped to engage a releasable lock for receiving and retaining the locking bar, and wherein the releasable lock is included within the mateable connector.

3. The anchor of claim 2, wherein the lock includes a pair of locking jaws each shaped to engage the locking bar.

4. The anchor of claim 1, wherein the mateable connector is attached to one of a front of an infant sear, a rear of the infant seat, a booster seat and a car bed.

5. The anchor of claim 1, further including:
a spring for biasing the first and second movable plates toward a front of the locking bar.

6. The anchor of claim 5, wherein the spring includes separate springs for individually biasing the first and second movable plates.

7. The anchor of claim 1, wherein the first and second movable plates are slidably engaged.

8. The anchor of claim 1, wherein the first and second movable plates are coplanar.

9. A mounting anchor system for a motor vehicle, comprising:
a locking bar, wherein a portion of the locking bar is shaped to receive a mateable connector, and wherein an interior of at least portions of first and second sides of the locking bar include grooves;
a first switch positioned adjacent the first side of the locking bar;
a first movable plate positioned to slidably engage the groove on the first side of the locking bar, the first movable plate including a first activation area for receiving a portion of the first switch and a first aperture for receiving a first rotatable arm;
a second switch positioned adjacent the second side of the locking bar, wherein the second side of the locking bar is opposite the first side of the locking bar;
a second movable plate positioned to slidably engage the groove on the second side of the locking bar, the second movable plate including a second activation area for receiving a portion of the second switch and a second aperture for receiving a second rotatable arm, wherein the mateable connector includes at least one of the first and second rotatable arms which when received in an associated one of the first and second apertures initiates movement of an associated one of the first and second movable plates and activation of at least one of the first and second switches; and
an electrical interface circuit electrically coupled to the first and second switches, the interface circuit providing an indication of whether the first and second switches are activated.

10. The system of claim 9, wherein the locking bar is shaped to engage a releasable lock for receiving and retaining the locking bar, and wherein the releasable lock is included within the mateable connector.

11. The system of claim 10, wherein the lock includes a pair of locking jaws each shaped to engage the locking bar.

12. The system of claim 9, wherein the mateable connector is attached to one of a front of an infant sear, a rear of the infant seat, a booster seat and a car bed.

13. The system of claim 9, further including:
    a spring for biasing the first and second movable plates toward a front of the locking bar.

14. The system of claim 13, wherein the spring includes separate springs for individually biasing the first and second movable plates.

15. The system of claim 9, wherein the first and second movable plates are slidably engaged.

16. The system of claim 9, wherein the first and second movable plates are coplanar.

17. A mounting anchor for a motor vehicle, comprising:
    a locking bar, wherein a portion of the locking bar is shaped to receive a mateable connector, and wherein an interior of at least portions of first and second sides of the locking bar include grooves;
    a first switch positioned adjacent the first side of the locking bar;
    a first movable plate positioned to slidably engage the groove on the first side of the locking bar, the first movable plate including a first activation area for receiving a portion of the first switch and a first aperture for receiving a first rotatable arm;
    a second switch positioned adjacent the second side of the locking bar, wherein the second side of the locking bar is opposite the first side of the locking bar;
    a second movable plate positioned to slidably engage the groove on the second side of the locking bar, the second movable plate including a second activation area for receiving a portion of the second switch and a second aperture for receiving a second rotatable arm, wherein the mateable connector includes at least one of the first and second rotatable arms which when received in an associated one of the first and second apertures initiates movement of an associated one of the first and second movable plates and activation of at least one of the first and second switches, and wherein the first and second movable plates are slidably engaged and coplanar; and
    a spring for biasing the first and second movable plates toward a front of the locking bar.

18. The anchor of claim 17, wherein the locking bar is shaped to engage a releasable lock for receiving and retaining the locking bar, and wherein the releasable lock is included within the mateable connector.

19. The anchor of claim 18, wherein the lock includes a pair of locking jaws each shaped to engage the locking bar.

20. The anchor of claim 17, wherein the mateable connector is attached to one of a front of an infant sear, a rear of the infant seat, a booster seat and a car bed.

21. The anchor of claim 17, wherein the spring includes separate springs for individually biasing the first and second movable plates.

* * * * *